Patented Nov. 23, 1943

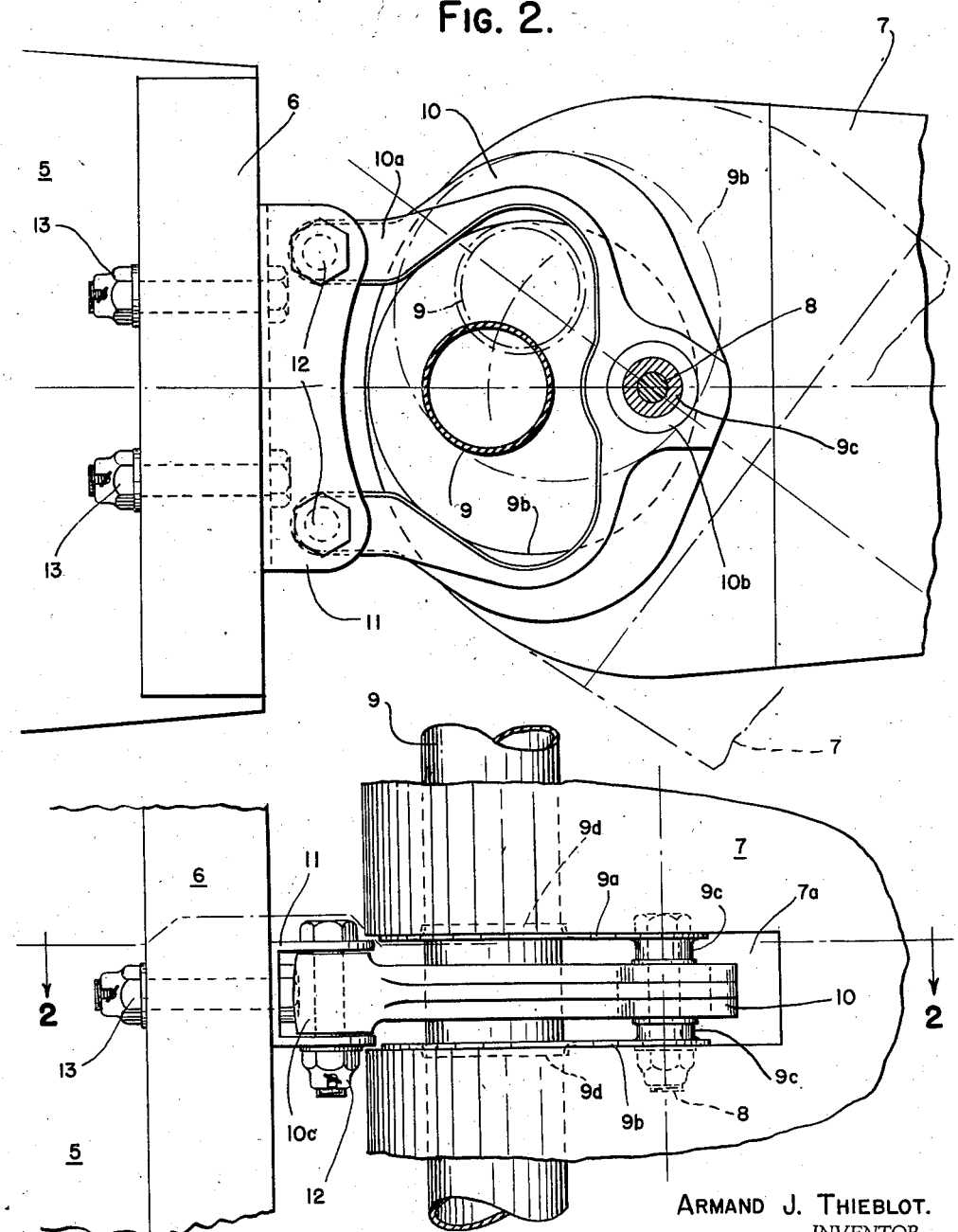

2,334,848

UNITED STATES PATENT OFFICE 2,334,848

AIRCRAFT CONTROL SURFACE MOUNTING

Armand J. Thieblot, Hagerstown, Md., assignor to Fairchild Engine and Airplane Corporation, a corporation of Maryland Application May 20, 1941, Serial No. 394,272

8 Claims. (Cl. 244—90)

The present invention relates to movable aircraft surfaces and more particularly to improvements in the mounting of such surfaces to the aircraft, its wings, or to other movable surfaces thereon.

In the design of control surfaces, particularly of high speed aircraft, it is essential that they be balanced both statically and dynamically to eliminate tendencies toward oscillation of the surface. This condition is commonly known as flutter and prior methods of dynamic balancing have included the placing of counterweights forward of the hinge axis to bring the center of mass nearer to the hinge axis. A better method of obtaining static and dynamic balance is accomplished by locating the hinge line or pivot axis sufficiently aft of the leading edge of the surface, and locating the load-carrying structural member of the movable surface ahead of the hinge line about which the surface is rotated, thereby minimizing or eliminating the use of balance weights. This structural member is subjected to shear, bending and torque loads and it may take the form of a spar, a main beam of suitable shape, or a nose box. In the hinge mountings of balanced surfaces of the above type it has frequently been necessary to interrupt or provide cutouts in the structural member to provide suitable clearance between the bracket supporting the surface from the wing, not only in the normal position but throughout all of the positions into which the surface may be rotated and other similar problems in design have been encountered.

These objections have been overcome and the above desirable objectives obtained by the present invention by the provision of a hinge bracket of a bifurcated form having a central opening within which the surface spar is free to be moved. This is accomplished by the novel bracket and its relationship to the attached surfaces with the minimum of projection beyond the profile sections of the main and trailing surfaces and without addressing any of its parts to the airstream beyond the profile of the combined surfaces. Another feature of the present arrangement is the saving in weight and the ease with which the several parts may be assembled, its accessibility for inspection and servicing, and the readiness with which the movable surface may be detached from the wing.

It is accordingly a major object of the present invention to provide a mounting for a movable surface which can be statically and dynamically balanced with the least amount of balance weight. It is also an object to provide a movable surface mounting which permits the load-carrying structural member to be disposed adjacent the leading edge of the surface and to extend continuously and without interruption past the hinge supports. It is also an object to provide a movable surface hinge assembly of a U-shaped or bifurcated type, which provides an enlarged opening between the hinge pivot and the trailing portion of the main wing within which the spar of the movable surface is free to be rotated as the surface is moved into its various positions.

It is a further object of the present invention to provide a hinge bracket of novel shape and construction which is disposed almost entirely within the cross sectional profile of the movable surface and does not project into the airstream. It is also an object to provide a hinge mounting arrangement which is light in weight, but of adequate strength, and which may readily be assembled and disassembled. A further object resides in the provision of a control surface mounting which is accessible at all times for inspection, and servicing, and which provides a convenient attachment by which the movable surface itself may be detached from the wing for purposes of inspection, repair or replacement.

Other advantages of the present invention may occur to those skilled in the art after a reading of the present description and the attached drawing forming a part hereof, in which:

Fig. 1 is a plan view of a control surface mounting embodying the present invention, showing portions only of the main wing and the control surface, and Fig. 2 is a cross sectional view looking spanwise of the wing as taken along the lines 2—2 of Fig. 1.

Referring now to both figures of the drawing, the trailing portion of the wing, airfoil, or other element of the aircraft to which the movable surface is hinged, is indicated by the numeral 5. This is shown and described for explanatory purposes only as the wing or main sustaining surface, but this invention is equally applicable to the horizontal and vertical tail surfaces or to movable surfaces from which other control surfaces are supported. The main wing portion is provided with a spanwise trailing edge member 6 to which the surfaces of the wing and its internal structure are attached. The movable surface is indicated at 7 and for the purposes of the present description will be referred to as an aileron, although the invention obviously is not limited thereto, as it is equally applicable for use in connection with elevators, rudders, tabs, flaps, and other movable surfaces.

The aileron 7 is provided adjacent its leading edge with a tubular spar or structural member 9 from which the aileron structure is built up and supported. The spar 9 extends spanwise of the aileron substantially the entire span thereof, and being preferably of a metal tube and relatively heavier than the materials of which the remainder of the aileron is constructed, causes the center of gravity of the surface to be moved toward the hinge axis of the surface and thereby facilitates its being balanced both statically and dynamically. In prior control surfaces in which the spar or main structural member was located aft of the hinge axis it was heretofore necessary to add balance weights, either internally or externally of the surface, in order to obtain the desired balance of the surface.

The aileron 7 is provided at spaced intervals with chordwise openings or slots 7a to accommodate the hinge supports. At each side of these spaced openings there is provided circular flanges 9a and 9b, each of which are provided with opposed openings 9d having outwardly extending lip portions which are welded or otherwise fixedly mounted upon the tubular spar 9. The flange members 9a and 9b are also provided with opposedly facing bushings or bearing portions 9c disposed adjacent the aft edge of the circular spar flanges, being centrally apertured to receive the hinge pivot bolt 8.

The hinge bracket is indicated at 10 and consists principally of a bifurcated yoke or "horseshoe" shaped element provided with two forwardly extending arm portions 10a which are more widely spaced apart intermediate their open and closed ends, the latter being provided with an apertured boss portion 10b to accommodate the hinge pivot 8. The bifurcated arms of the hinge bracket are preferably T-shaped in cross section with the flange of the T spaced inwardly toward the spar and the stem portion extending outwardly thereby providing a yoke of relatively great strength and rigidity while comparatively light in weight. The bifurcated arms 10a are provided at their forward extremities with apertured boss portions 10c to accommodate the spanwise mounting bolts 12, the axes of the latter preferably being parallel to that of the hinge. A channel or U-shaped bracket fitting 11 is fastened to the structural element 6 by the bolts 13 passing through suitable holes in the web of the channel 11 and the beam 6. The bracket fitting 11 is disposed vertically upon the structural element 6, being provided with suitably spaced apertures to match the openings in the boss or lug portions 10c of the bracket and to accommodate the through bolts 12 by which the hinge bracket 10 is fixedly attached to the main wing portion 5.

It will be noted that as the aileron 7 is rotated into the position indicated by the broken lines to its extreme position about the hinge pivot 8, the spar 9 is free to move within the enlarged opening within the bracket 10, the aileron being rigidly supported from the hinge pivots 8 by means of the eccentrically apertured flange elements 9a and 9b and rotated about the axis of their bushings 9c, the flanges being rigidly attached to the spar at 9d. As the aileron, or other movable surface, is moved in the opposite direction the spar is similarly rotated into the corresponding opening at the opposite side of the bracket. Obviously, in surfaces which are rotated through greater angles, or entirely in the one direction, as compared to the other the shape of the bracket would not necessarily be symmetrical but would be designed to suit the particular installation. It will also be noted that in any position of the movable surface 7, only the forwardly spaced portions 10a of the bracket are exposed beyond the cross sectional profile of the surface, but are well within the combined cross sectional outline of the main wing 5 and the trailing surface 7 such that no drag results from exposure to the relative airstream. As will be seen in Figs. 1 and 2 the bolts 12 are readily accessible from both above and below the wing for purposes of removing or attaching the hinged surface. Each control surface 7 is obviously provided with a plurality of hinge mounting assemblies such as shown in the drawing, as well as with suitable means for operating the surfaces into any desired position.

Other advantages and modifications of the present invention which may occur to those skilled in the art both as to arrangement and detailed design are intended to come within the scope and spirit of the present invention as defined by the appended claims.

I claim:

1. In an aircraft surface mounting, an airplane element, a surface adapted for pivotal movement with respect to and disposed in streamlined relationship with said element, said surface having its main structural member disposed forward of its pivotal axis and a surface mounting enclosing said member attached to said airplane element and engaging said pivot axis, said mounting being entirely disposed within said streamlined profile.

2. In an aircraft surface mounting, an airfoil, a pivoted surface trailing and completing said airfoil profile having a main spar disposed forward of its pivot axis and a U-shaped member engaging said pivot axis and having its arms spatially encircling said spar and attached to said airfoil, said member being entirely disposed within said complete airfoil profile.

3. In an aircraft surface mounting, an airfoil, a normally aligned rotatable surface having a main spanwise structural element disposed between its rotational pivot axis and the leading edge of the surface and a member supported from said airfoil engaging said surface pivot and having a central opening within which said spar is free to move as said surface is rotated, said member disposed entirely within the normal profile formed by said aligned airfoil and surface.

4. In an aircraft, an airfoil surface mounting, a rotatable surface forming a trailing portion of said airfoil having a continuous spar disposed forward of its rotational pivot, and means for supporting said surface from said airfoil, disposed entirely within the outline of said airfoil and trailing portion, comprising a member having a central opening within which the said spar is adapted to move with said rotatable surface.

5. In an aircraft surface mounting, a main airfoil, a rotatable surface forming a trailing portion of said airfoil profile and having a continuous spar disposed forward of its rotational pivot, and a mounting for supporting said rotatable surface from said airfoil comprising a U-shaped member having its open portion detachably fastened to the rear of said main airfoil and having its closed end apertured to receive said trailing surface pivot, the sides of said member being disposed outwardly to provide an enlarged central opening within which the said spar is free to move as said surface is rotated, said outwardly displaced sides being disposed within said complete airfoil profile.

6. In an aircraft surface mounting, a wing, a rotatable surface having a main spanwise structural element disposed between its rotational pivot axis and an edge of said surface adjacent said wing, said surface being provided with chordwise openings extending from said edge to a point beyond said pivot axis, plate elements attached to said spar forming side wall portions of said openings, the said plate elements having opposed apertures for said surface pivot, and a bifurcated bracket member encircling said structural element and disposed within said surface opening, having its bifurcated ends removably attached to said wing and its closed end apertured for engagement by said rotational pivot, said member being contained entirely within the combined profile formed by said wing and its attached surface.

7. A hinge mounting for a control surface comprising a bifurcated member provided with means at its bifurcated terminals for attachment to a portion of the aircraft, bearing means at its closed end for engagement by the hinge pivot of said control surface, the sides of said member being displaced outwardly for the uninterrupted accommodation of a spanwise structural element disposed in the leading portion of said control surface, the said member disposed entirely within the composite profile formed by said surface and said aircraft portion.

8. In aircraft, having a main wing and an aligned trailing surface containing a continuous leading edge spar, a hinge bracket for the support of said surface from said main wing comprising a U-shaped member having its open forward terminals detachably supported from said main wing, its trailing portion apertured to provide a bearing for the said surface pivot, and having an enlarged central opening at its intermediate portion through which the said surface spar passes uninterruptedly and is free to move as said surface is rotated, said hinge bracket lying entirely within the combined profile of said wing and said trailing surface.

ARMAND J. THIEBLOT.